United States Patent
Patarra et al.

(10) Patent No.: US 6,796,319 B1
(45) Date of Patent: Sep. 28, 2004

(54) PORTABLE COOLER WITH UMBRELLA

(76) Inventors: Samuel F. Patarra, 111 Elysium Dr., Royal Palm Beach, FL (US) 33411; Anthony Battaglia, 3095 SE. Ranch Acre Cir., Jupiter, FL (US) 33478

( * ) Notice: Subject to any disclaimer, the term of this patent is extended or adjusted under 35 U.S.C. 154(b) by 0 days.

(21) Appl. No.: 10/405,122

(22) Filed: Apr. 2, 2003

Related U.S. Application Data

(63) Continuation-in-part of application No. 09/917,551, filed on Jul. 30, 2001, now Pat. No. 6,554,012.

(51) Int. Cl.$^7$ .............................. A45B 3/00; B62B 3/02
(52) U.S. Cl. ...................... 135/16; 108/50.12; 108/138; 62/258; 62/331; 62/457.7; 220/592.03; 220/592.2
(58) Field of Search .......................... 135/16; 108/50.12, 108/138, 145; 62/258, 331, 457.7; 220/592.2, 592.03

(56) References Cited

U.S. PATENT DOCUMENTS

| | | | | |
|---|---|---|---|---|
| 4,581,902 A | * | 4/1986 | Starck et al. | ................. 62/258 |
| 5,269,157 A | * | 12/1993 | Ciminelli et al. | .......... 62/457.7 |
| 5,285,656 A | * | 2/1994 | Peters | ........................ 62/457.1 |
| 5,480,170 A | * | 1/1996 | Kaiser, II | ..................... 280/30 |
| 5,503,086 A | * | 4/1996 | Hoffman et al. | ............ 108/138 |
| 5,876,047 A | * | 3/1999 | Dennis | .................... 280/47.35 |
| 6,216,488 B1 | * | 4/2001 | Rucker | ....................... 62/457.7 |
| 6,374,839 B2 | * | 4/2002 | Patarra | ........................ 135/16 |
| 6,536,733 B1 | * | 3/2003 | Sharp | ........................ 248/519 |
| 6,554,012 B2 | * | 4/2003 | Patarra | ........................ 135/16 |

* cited by examiner

*Primary Examiner*—Robert Canfield
(74) *Attorney, Agent, or Firm*—Oltman, Flynn & Kubler

(57) ABSTRACT

A portable cooler is disclosed having wheels at one end, a pop-up tray table on top and an umbrella stand located at the wheeled end of the cooler.

16 Claims, 2 Drawing Sheets

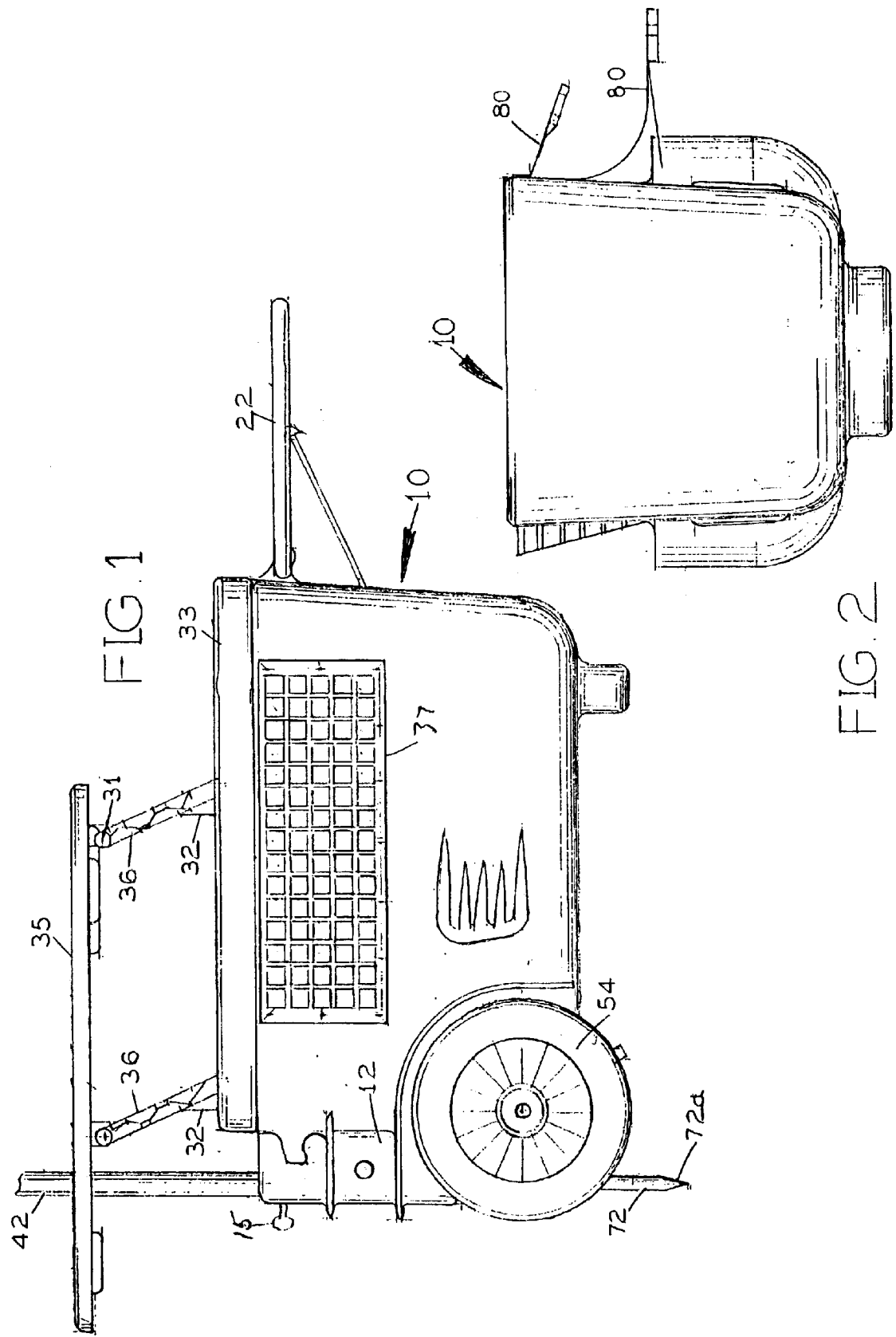

PORTABLE COOLER WITH UMBRELLA

This application is a Continuation in Part of application Ser. No. 09/917,551 filed Jul. 30, 2001, which is now U.S. Pat. No. 6,554,012.

BACKGROUND OF THE INVENTION

1. Field of the Invention

This invention relates to coolers and more specifically to portable coolers with umbrellas.

2. Description of the Prior Art

Portable coolers are an otherwise well known modem convenience. Some specific examples are the following:

U.S. Pat. No. 6,261,488 to Rucker shows a wheeled cooler with a plurality of compartments and a handle with which to pull it.

U.S. Pat. No. 6,374,839 B2 to Patarra shows a wheeled cooler with at least one compartment, wheels and the addition of an umbrella located in the center of the compartment.

It is an object of the instant invention to provide a portable, wheeled cooler with a removable umbrella located at the wheeled end thereof along with a pop-up tray table.

BRIEF DESCRIPTION OF THE DRAWINGS

FIG. 1 is a side elevation of the instant invention.

FIG. 2 is a side elevation of another side of the invention of FIG. 1.

DESCRIPTION OF THE PREFERRED EMBODIMENT

Figure 4:
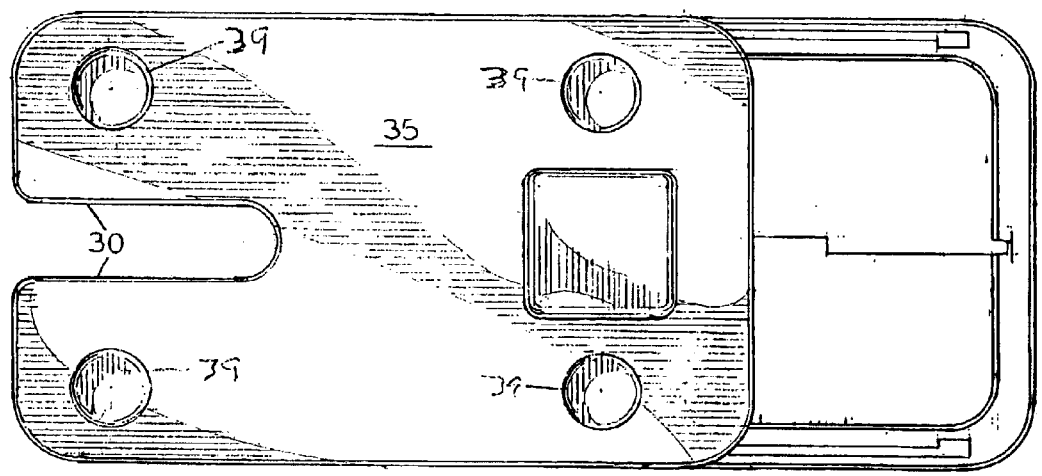
FIG. 4 is a top elevation of the invention of FIG. 1.

In FIG. 1, we see the instant cooler 10 from the side with the umbrella stand, pole or mast 42 passing through the wheeled portion 12 of cooler 10. Here mast 42 also passes through a U-shaped cutout 30 (FIG. 4) in the pop-up tray table 35. There may be a thumb screw 15 in the wall of the cooler for engaging and holding mast 42.

Cooler 10 is otherwise well known, as from U.S. Pat. No. 6,374,839 B2 mentioned above. Therefore, this disclosure will not contain detailed description of known art. It is limited to novel aspects only.

Cooler 10 has wheels 54 at one end and a pull handle 22 at the other. Tray table 35 is supported by supports 36. It may rise to its working position when the cooler 10 is stopped and it may rest retracted and flush with cooler 10's lid 33 when stored or when being pulled. Inside handle 22 is a cutting tray.

Supports 36 are rotatably placed upon cooler 10 lid 33. Supports 36 have rotating links 31 both on the bottom of tray table 35 (shown) and within the lid 33 (not shown). As tray table 35 is pulled up from its resting and/or storage position upon lid 33, supports 36 rotate around links 31 until tray table 35 is fully in its upright position. At the full upright position, supports 36 rest upon lid 33 using foot supports 32. Foot supports 32 provide a stopping point for the rotation of supports 36 and further provide a base upon which tray table 35 may rest in up and working position. Tray table 35 has holes 39 for holding fishing poles.

In operational position with tray table 35 up, umbrella mast 42 passes down through opening 30 of tray table 35 and then through the wheeled end 12 of cooler 10. Mast 42 ends in a pointer 72 having a point 72a for entering the ground. When pointer 72 and its point 72a have been stuck into the ground, cooler 10, its contents and tray table 35 are relatively solidly in operational place.

By passing mast 42 through opening 30, mast 42 may add extra support to tray table 35. This can be especially so on a windy day.

Rather than pass directly through the body of cooler 10 at wheeled end 12, another embodiment allows the mast 42 to be retained by an umbrella strap 80 located outside the body proper of cooler 10. See FIG. 2. Strap 80 allows the mast 42 to hug the outside side of cooler 10 at the wheeled section. Great purchase is still afforded to mast 42 via pointer 72 and its point 72a. Thus, cooler 10 is still held firmly in place. Any increased rigidity mast 42 may give to tray table 35 via hole 30 is still available. Umbrella strap 80 is preferably located along one long side of cooler body 10 for greatest overall balance along body 10. There is a cargo net 37 for holding miscellaneous articles on the side of the cooler.

Figure 3:
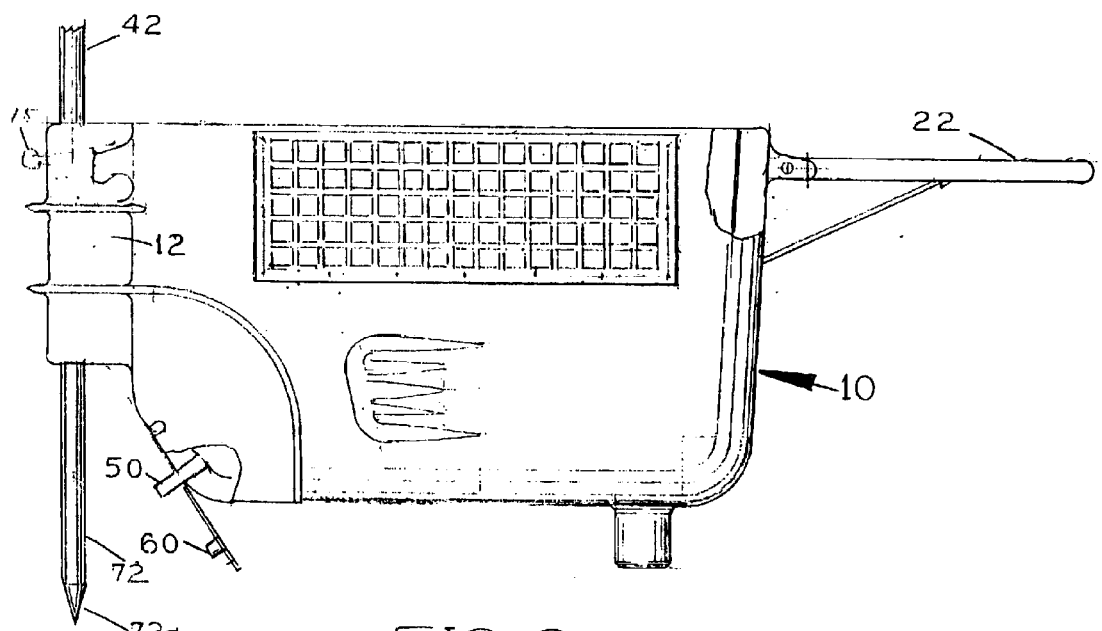
FIG. 3 is a side elevation of the invention of FIG. 1.

FIG. 3 shows the cooler 10 of FIG. 1 without the wheels 54. Here, typical drain spout 50 is shown along with its typical drain spout cap 60. FIG. 3 more clearly shows how mast 42 passes through body 10 and enters the ground. Typical structure required to hold mast 42 in place within body 10 is well known through the parent disclosure indicated above, now U.S. Pat. No. 6,374,839, and is not necessary to be reiterated here.

IN OPERATION, cooler 10 is pulled to a desired resting spot on its wheels 54 via pull handle 22. At the desired spot, tray table 35 is brought upwards to its operational position and umbrella mast 42 is pushed down through opening 30 therein. Mast 42 goes further down through either the cooler 10 body at the wheeled portion 12 or is held fast against the body by umbrella strap 80. Mast 42 is pushed down far enough to force point 72a of pointer 72 firmly into the ground.

Umbrella mast 42 helps to provide some increased extra rigidity to tray table 35.

As the day is done, mast 42 comes up out of the ground and out of the cooler 10. Tray table 35 goes back down into storage position and cooler 10 can be pulled back home.

It should be understood that the foregoing relates to preferred embodiments of the invention and that modifications may be made without departing from the spirit and scope of the invention as set forth in the following claims.

We claim:

1. A portable cooler, comprising:
   a body;
   wheels on one side of said body;
   a pull handle on the side of said body opposite to said wheels;
   a lid on top of said body;
   a pop-up tray table on said lid of said body;
   an umbrella with mast and pointed end on said mast; and
   means for allowing said mast to pass through said pop-up tray table and said body on the wheeled side of said body such that said pointed end may stick into the ground.

2. The cooler of claim 1 wherein said mast may be held against the outside of said body via strap means.

3. The cooler of claim 1 wherein said mast may be held against the outside of said body near said wheels via strap means.

4. The cooler of claim 1 wherein said mast may be held against the outside of said body along a long side of said body via strap means.

5. The cooler of claim 1 wherein said pop-up tray table rotates into up position upon rotating links.

6. The cooler of claim 1 wherein said means for allowing said mast to pass through includes structure required to hold said umbrella and said mast in place within said body.

7. A portable cooler, comprising:

a body;

wheels on one side of said body;

a pull handle on the side of said body opposite to said wheels;

umbrella mast-holding straps on the same side of said body as are said wheels;

a pop-up tray table on a lid of said body;

a umbrella with mast and pointed end on said mast; and means for allowing said mast to pass through said pop-up tray table and be held against said body on the wheeled side of said body such that said pointed end may stick into the ground while holding said body in place.

8. The cooler of claim 7 wherein said pop-up tray table rotates into up position upon rotating links.

9. A portable cooler, comprising:

a body;

wheels on one side of said body;

a pull handle on the side of said body opposite to said wheels;

umbrella mast-holding straps on said body;

a pop-up tray table on a lid of said body;

an umbrella with mast and pointed end on said mast; and means for allowing said mast to pass through said straps and be held against said body such that said pointed end may stick into the ground while holding said body in place.

10. The cooler of claim 9 wherein said mast-holding straps are on the same side as said wheels.

11. The cooler of claim 9 wherein said mast-holding straps are on a long side of said body.

12. The cooler of claim 9 wherein said pop-up tray table rotates into up position upon rotating links.

13. The cooler of claim 9 wherein said pop-up tray table rotates into up position upon rotating links.

14. The cooler of claim 1 including a cargo net for holding articles on said cooler.

15. The cooler of claim 1 including a hole in said table for a fishing rod.

16. The cooler of claim 7 including a tray in said handle.

* * * * *